Patented Sept. 18, 1951

2,568,352

UNITED STATES PATENT OFFICE 2,568,352

PREPARATION OF CATALYST GEL BEADS BY EMULSIFYING

Winfred O. Milligan, Houston, Tex., assignor to Houdry Process Corporation, Wilmington, Del., a corporation of Delaware No Drawing. Application May 1, 1944, Serial No. 533,643

14 Claims. (Cl. 252—448)

The present invention relates to new and improved catalysts and to methods for their preparation.

At the present time one of the important types of catalysts is the dried gel type. Such catalysts are in common use in refining oil for such processes as cracking higher boiling hydrocarbon oils to gasoline and the treatment of naphthas and gasoline to reduce unsaturation and increase the octane rating of the product. Such catalysts in general appear in two distinct forms usuable in different types of plants and are not interchangeable. Thus, one type of catalyst is in pieces of substantial size, as for instance, pellets 4 mm. in diameter and 4 mm. in length. Catalysts of this general size range are employed either in a plant having a static bed which is regenerated periodically and renewed after an interval of a year or more, or in a plant having a moving bed of catalyst. The second type of catalyst is extremely finely divided and is generally produced by the crushing of a dried gel. When such a catalyst is employed, no bed of catalyst exists, the catalyst being maintained in suspension in a gas or vapor phase. Plants operating in this manner have had substantial difficulties. The catalyst, even though ground to an extremely fine powder, is still an abrasive having sharp edges. When the powder is pumped through a plant, even in suspension, it wears away the inner surface of all pipes. This not only is disadvantageous from the mechanical aspect, but the iron worn away from the equipment contaminates the catalyst thereby having an adverse catalytic effect when subsequently introduced into the conversion zone. The principal means which have been taken to overcome this problem is the reduction of rate of flow. This means however introduces other problems such as catalyst settling out of the stream.

Objects of the present invention are to provide improved methods for the production of the finely divided gel type catalyst; to provide finely divided catalysts of improved physical form whereby substantially to eliminate abrasion in the plant in which the suspension of the catalyst in a gas vapor is moved through pipes; and to provide inexpensive methods for the production of finely divided catalyst for use in other catalyst manufacturing methods.

In accordance with a preferred specific form of the present invention a sol containing catalyst components is emulsified in a liquid. The droplets of sol are maintained in emulsified form until the sol sets as hydrogel. The small pieces of hydrogel are then finished, which finishing operations may include purification to remove such materials as sodium, drying, heat treating, and the like.

This invention is of particular application in the preparation of binary silicious catalysts such as silica-alumina, silica-zirconia, silica-beryllia, and ternary compositions such as silica-alumina-zirconia, silica-alumina-beryllia, and silica-zirconia-beryllia. Such catalysts may alternatively contain in mixture with silica one or more promoters such as magnesium, vanadium, manganese, chromium, tungsten, lithium, calcium, molybdenum, and nickel or an oxide of any of these materials. The promoters may be present in amount either more or less than 1%. Likewise the promoters may be added to any of the binary or ternary catalysts mentioned. The silica is in general obtained from a soluble sodium silicate, such as "N-brand" silicate or sodium meta-silicate. A suitable solution of the other components to be added is combined with the soluble silicate and the pH adjusted to give a sol. Various specific procedures may be employed. Thus in the case of silica-alumina catalysts, an acid sol of the silica and alumina of a pH about 3 may be prepared and a basic material then added to reduce the coagulation time. Likewise, sodium aluminate may be added to the sodium silicate and an acidic material added if desired to reduce the coagulation time. The sols employed in accordance with this invention are aqueous sols. Accordingly, the material in which the sol is emulsified may be any liquid immiscible with water. Suitable liquids are hydrocarbon oils, alkyl halides, and polyhalo alkanes for instance carbon tetrachloride. There should be employed at least one volume of the water immiscible liquid per volume of sol emulsified therein. When the liquid in which the sol is emulsified is of low specific gravity as in the case of hydrocarbon oils, the emulsified material may be allowed to settle to the bottom of the oil phase after the gel coagulates whereas if a heavy material such as carbon tetrachloride is employed the emulsified particles may be allowed to rise to the top. Accordingly, a rough, initial physical separation of the two may be effected. If desired, further separation of the gel particles from the water immiscible liquid may be made as by draining or the like.

An alternative method of preparation involves the emulsification of a sol in a water immiscible liquid and the addition of an agent soluble in the water immiscible liquid which functions as a coagulant. Organic acids and bases are examples of such coagulating agents.

After coagulation, the gel particles either in mixture with the water immiscible liquid or after separation thereof are preferably purified by washing with water whereby to remove sodium. Further sodium removal may be effected by dialysis with an aqueous solution of an ammonium salt. Treatment with an ammonium salt may, if desired, be followed by further washing with water to remove the anion of the ammonium salt which may remain adsorbed in the gel. Either with or without purification the obtained gel particles are in the form of a fine powder. As an alternative to purification before drying, the material may be purified after drying. It is, however, preferred that the particles of gel be purified prior to drying inasmuch as following drying the pieces tend to decrepitate upon wetting with water. The purified and dried gel may then be subjected to calcination which effects additional shrinkage of the pieces and prepares them in best form for use. Separate calcination prior to use is not entirely necessary, however, as calcination may occur during use. Thus in a process involving alternate on stream and regeneration periods when the regeneration is effected at substantially elevated temperatures as for instance at temperatures of upward of 800° F, the calcination occurs during use.

The size of the finished gel pieces will depend to substantial extent upon the fineness of division of the sol which is effected in its emulsification. By emulsification the particle size is in general below 100 microns and in general in the range of 50 to 100 microns. By increasing the effectiveness of the emulsification an average particle size of the finished product substantially less than 50 microns may be obtained. When an average particle size less than 50 microns is produced, the powder may be incorporated in a catalytic gel as disclosed in copending application of T. H. Milliken, Ser. No. 529,594, filed April 5, 1944, now U. S. Patent No. 2,487,065.

The following examples are illustrations of the present invention and should be interpreted as such and not as limiting the scope hereof:

*Example 1.*—A sodium aluminate solution was prepared of specific gravity 1.042 at 20° C. This solution was stabilized by addition thereto of 1% "N-brand" silicate based on alumina in the solution. A second solution was prepared containing "N-brand" silicate of specific gravity 1.25 at 20° C. Of the sodium aluminate solution 810 parts by volume were added to 728 parts by volume of the sodium silicate solution. The sol so prepared was introduced into twice its volume of carbon tetrachloride and shaken vigorously until the sol set to a gel. The setting of the gel may readily be determined by withholding a small portion of the sol for observation. The described sol requires roughly 3 minutes to set. The particles of gel were separated from the carbon tetrachloride and the mass of particles was allowed to soak for one hour in each of six baths of ammonium chloride. The mass of particles was then water washed until chloride free and was then placed in an oven and dried at 210° F. The dry glassy particles were heat treated and employed for cracking of a gas oil to gasoline.

*Example 2.*—220 parts by volume of an aluminum sulfate solution of 1.098 specific gravity was mixed with 17 parts by volume of sulfuric acid of specific gravity 1.0865. This solution was added to a solution of 296 parts by volume of "N-brand" silicate specific gravity 1.182 in 1466 parts by volume of water. The sol so produced had roughly an 8 minute setting time. The sol so produced was mixed with slightly more than an equal volume of lubricating oil of S. A. E. viscosity equal 20. The mixing was effected with a turbine stirrer, and stirring was continued until a separate sample of sol had set as gel. The emulsion was mixed with approximately two and one half times its volume of water and heated to 170° F. for one hour. Spherical white particles of gel then settled to the bottom of the aqueous phase. These gel particles were treated with ammonium chloride, washed with water, dried, and employed as indicated in Example 1.

While this invention has been described particularly in relation to the preparation of plural component catalysts it is likewise applicable to the preparation of single component gels such as silica gel.

I claim as my invention:

1. The process of catalyst manufacture which comprises emulsifying an inorganic aqueous sol in a water immiscible liquid, maintaining said sol emulsified by agitation until said sol sets as a multitude of pieces of hydrogel, separating said hydrogel from the water immiscible liquid, purifying said pieces of hydrogel by removal of water-soluble materials included therein and drying said hydrogel pieces.

2. The method of catalyst manufacture which comprises preparing an aqueous sol from a soluble silicate and a compound of a metal, the oxide of which is water-insoluble, emulsifying said sol in a water immiscible liquid by rapid agitation, maintaining said sol emulsified in said liquid until said sol sets as a plural oxide hydrogel in finely divided generally spherical pieces, separating said pieces of hydrogel from the water immiscible liquid, purifying said pieces of water-soluble components and drying said pieces.

3. The method according to claim 2 in which said drying is effected prior to said purifying.

4. The method of catalyst manufacture which comprises preparing silicious mixed oxide aqueous sol, agitating said sol in a water immiscible liquid to emulsify said sol in said liquid, maintaining said sol emulsified in said liquid until said sol sets as a multitude of pieces, separating said pieces from said water immiscible liquid, soaking the separated pieces in an aqueous salt solution and drying said pieces whereby to produce dried gel type catalysts.

5. The method of catalyst manufacture which comprises preparing an inorganic aqueous sol, agitating a batch of said sol with a body of water immiscible liquid to form an emulsion, adding to the emulsion a coagulant for said sol which is soluble in said water immiscible liquid whereby said sol sets as a multitude of finely divided pieces of hydrogel, separating said hydrogel from the water immiscible liquid, and drying said pieces of hydrogel whereby finely divided gel is produced.

6. The method of preparing contact materials which comprises agitating a mixture of an aqueous sol comprising silica and a water immiscible liquid to form an emulsion with said sol emulsified in said liquid, continuing agitation of the emulsion until said sol is broken up into finely divided droplets and said droplets of sol coagulate as finely divided substantially spherical particles of hydrogel, separating the hydrogel from said liquid and drying said hydrogel whereby finely divided dried gel in generally spherical pieces is obtained.

7. The process in accordance with claim 6, in which the rapidity of agitation is controlled to determine the size of the formed pieces.

8. The method of preparing contact materials which comprises admixing an aqueous solution of a water soluble aluminum compound with an aqueous solution of a water soluble silicate to form a hydrosol, introducing the formed hydrosol into a body of water immiscible liquid admixing the hydrosol and the water immiscible liquid by agitation, and continuing the agitation for a time sufficient for the hydrosol to set to a hydrogel.

9. The method of preparing contact materials which comprises incorporating an aqueous acid solution of an aluminum salt with an aqueous solution of an alkali metal silicate to form a sol, forming an emulsion by admixing and stirring said sol with a larger volume of water immiscible liquid, continuing stirring of said emulsion for a time at least sufficient for the sol to set as a hydrogel, adding water to the stirred mass to form a separate aqueous layer, heating the thus obtained layered body of liquid whereby particles of silica-alumina gel are caused to settle in the aqueous layer, removing the formed particles, purifying the particles of alkali metal ions, and washing, drying, and calcining the purified particles.

10. An improved process for preparing inorganic gels in minute spherical particles, which comprises emulsifying a hydrosol of the desired gel as the internal phase in a water immiscible liquid, agitating the emulsion to prevent separation of the phases until the hydrosol is set to a gel and separating the gel particles from the water immiscible liquid.

11. The process of preparing inorganic gels in small particles, which comprises emulsifying an inorganic aqueous sol in a water immiscible liquid, said sol containing water soluble impurities, maintaining said sol emulsified by agitation until said sol sets as a multitude of pieces of hydrogel including said water soluble impurities, separating said hydrogel from the water immiscible liquid, purifying said pieces of hydrogel by removal of water-soluble materials included therein, and drying said hydrogel pieces.

12. The method of forming plural oxide inorganic gels in small substantially spherical particles, which comprises preparing an aqueous sol from a soluble silicate and a compound of a metal whose oxide is water insoluble, emulsifying said sol in a water immiscible liquid by rapid agitation, maintaining said sol emulsified in said liquid until said sol coagulates as a plural oxide hydrogel, whereby the hydrogel is formed in finely divided generally spherical pieces, and separating said pieces of hydrogel from the water immiscible liquid.

13. Method of preparing plural oxide inorganic gels in small substantially spherical particles, which comprises admixing a water soluble aluminum compound and a water soluble silicate in an aqueous medium to form a hydrosol, emulsifying said hydrosol in a water immiscible liquid by rapid agitation, maintaining said hydrosol emulsified in said liquid until said hydrosol coagulates to hydrogel, whereby the hydrogel is formed in finely divided generally spherical pieces, and separating said pieces of hydrogel from the water immiscible liquid.

14. The method of preparing gels comprising silica and alumina in the form of small particles, which comprises preparing a hydrosol comprising silica and alumina capable of setting in not more than about eight minutes, emulsifying the said hydrosol by agitation with a water immiscible liquid to form small droplets of hydrosol suspended in said liquid, continuing the agitation until the suspended droplets set to hydrogel in the form of small substantially spherical particles, and separating said particles from the water immiscible liquid.

WINFRED O. MILLIGAN.

REFERENCES CITED

The following references are of record in the file of this patent:

UNITED STATES PATENTS

| Number | Name | Date |
| --- | --- | --- |
| 1,146,363 | Statham | July 13, 1915 |
| 1,506,118 | Govers | Aug. 26, 1924 |
| 1,614,636 | Wachtel | Jan. 18, 1927 |
| 1,755,496 | Behrman | Apr. 22, 1930 |
| 1,843,576 | McClure et al. | Feb. 2, 1932 |
| 2,192,125 | Brown et al. | Feb. 27, 1940 |
| 2,326,523 | Connolly et al. | Aug. 10, 1943 |
| 2,350,508 | Hemminger | June 6, 1944 |
| 2,384,946 | Marisic | Sept. 18, 1945 |

FOREIGN PATENTS

| Number | Country | Date |
| --- | --- | --- |
| 15,365 | Great Britain | 1915 |